(No Model.)  2 Sheets—Sheet 1.
W. MEEKER.
BALL BEARING.
No. 534,047. Patented Feb. 12, 1895.
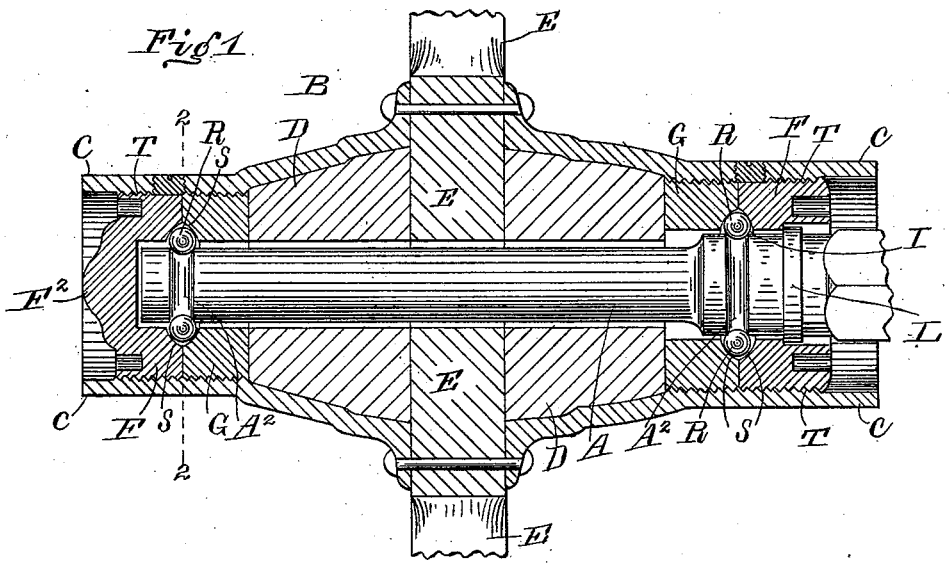
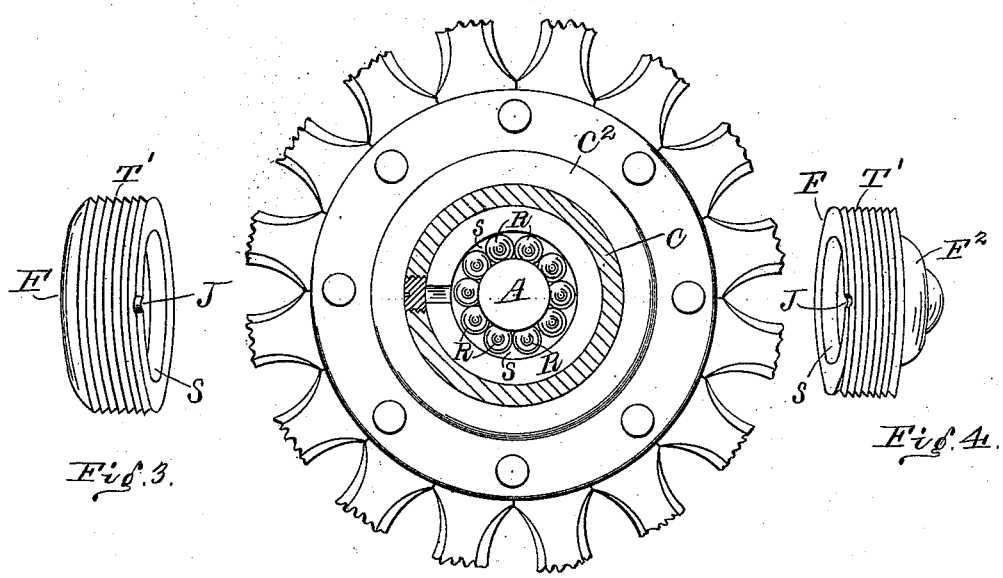
Witnesses
Josiah Bartlett
L. de Camp
Inventor
William Meeker
per Wm. Hubbell Fisher
Attorney

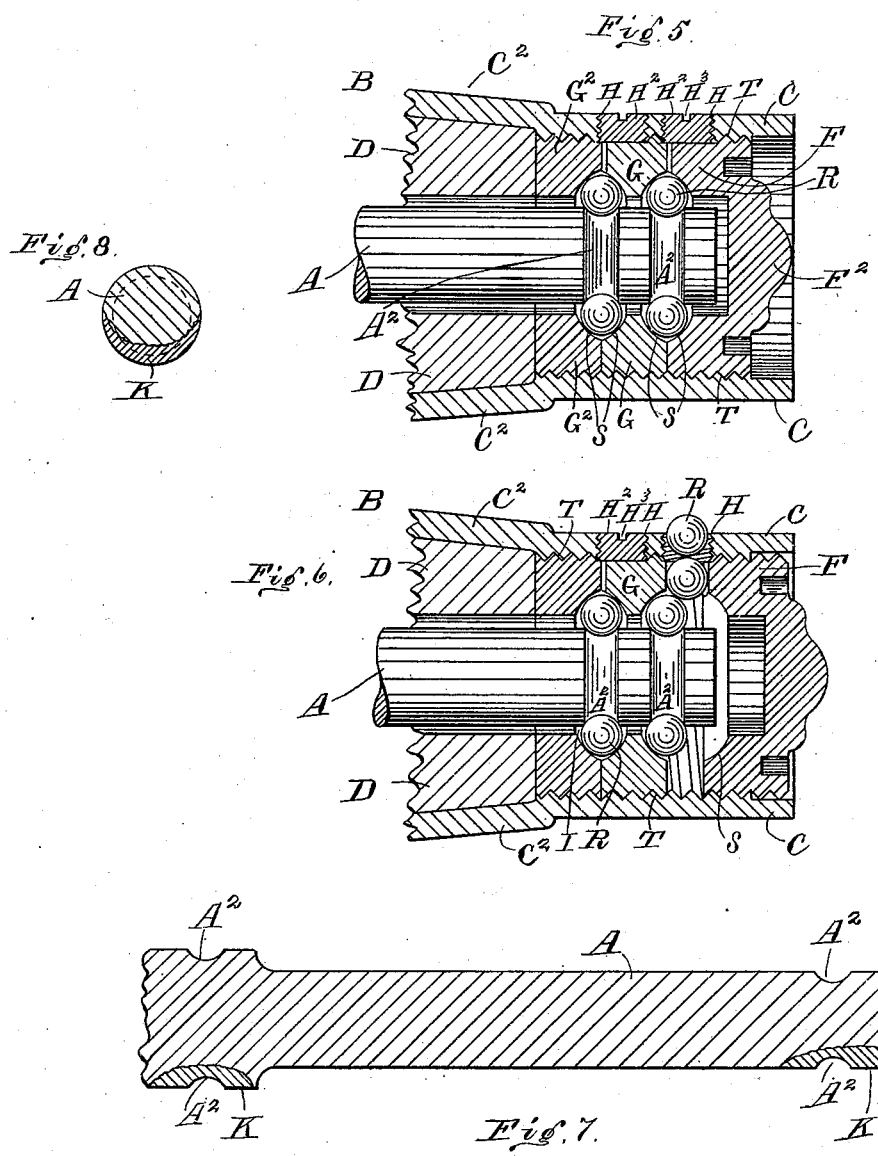

UNITED STATES PATENT OFFICE.

WILLIAM MEEKER, OF WASHINGTON COURT-HOUSE, OHIO.

BALL-BEARING.

SPECIFICATION forming part of Letters Patent No. 534,047, dated February 12, 1895.

Application filed July 19, 1894. Serial No. 517,979. (No model.)

*To all whom it may concern:*

Be it known that I, WILLIAM MEEKER, a citizen of the United States, and a resident of the city of Washington Court-House, in the county of Fayette and State of Ohio, have invented certain new and useful Improvements in Ball-Bearing Wheels and Axles, of which the following is a specification.

The several features of my invention and the various advantages resulting from their use conjointly or otherwise, will be apparent from the following description and claims.

In the accompanying drawings, making a part of this application, and in which similar letters of reference indicate corresponding parts,—Figure 1, Sheet 1, represents (partly in section and partly in elevation) a wheel-hub and axle, bearings, and accompanying mechanism. Fig. 2 represents a view of that position of the hub and accompanying parts which lie behind (to the right of) a plane passing through the dotted line 2, 2, of Fig. 1, that end portion of the section and parts in elevation being shown which face toward the left in Fig. 1. Fig. 3, same sheet, indicates in perspective one of the ball-bearing rings. Fig. 4, same sheet, is a view in perspective of a ball bearing ring which constitutes the axle cap. Fig. 5, Sheet 2, is a vertical, central longitudinal section of one end portion of the said hub and accompaniments. Fig. 6, same sheet, is a similar section of the parts shown in Fig. 5, the parts being shown in position to enable the balls to be introduced into the rings.
Fig. 7, Sheet 2, represents a vertical longitudinal section of the axle embodying a certain feature of my invention. Fig. 8, Sheet 2, is a vertical transverse section of the said axle taken in the plane of the dotted line 8, 8, of Fig. 7. The figures on Sheet 2 are on a larger scale than those on Sheet 1.

I will now proceed to particularly describe my invention.

A indicates the axle, provided with circumferential grooves or channels $A^2$, in each of which a series of steel balls R are arranged to run.

B indicates the hub. The latter is provided at each end with cylindrical metallic extensions termed bands C. These bands are suitably secured to the rest of the hub. In the present instance, each is in one with a band as $C^2$, located upon and extending around the wooden portion D of the hub.

The spokes E are suitably secured to the hub. The manner of securing them thereto shown in Figs. 1 and 2 is a common and well known one. The interior of each band C is provided with a screw thread T.

For each set of ball bearings there are two concentric rings F and G, of a diameter equal to that of the space inclosed by the surrounding band C. Each of these rings is exteriorly provided with a screw thread $T'$, which engages the screw thread of the band C when the rings are introduced therein. Each ring has an annular recess S, which in connection with the adjacent ring forms a recess or groove, which latter receives substantially one half of each ball, while the channel $A^2$ of the axle receives the other half of each ball, substantially as shown in Figs. 1, 5 and 6.

When the balls R are in position in said annular grooves, the rings being screwed to place, as shown in Figs. 1 and 5, the axle, balls, rings and hub are in working position.

I have found that in practice it is difficult to put the balls in place, viz: in the position shown owing to their tendency to roll out of place so long as the axle is horizontal.

To enable the balls to be readily and quickly inserted in place, while the axle remains horizontal, is the object of one feature of my invention. This feature I will now proceed to describe.

A hole H is drilled through the top of the front band C of the hub, and a similar hole H is drilled through the top of the rear of band C of the said hub. Each hole H is of a diameter sufficient to admit of the steel balls R, one at a time passing down through it, substantially as shown in Fig. 6. When the opening H is not in use, it is closed by means of a screw plug or stopple $H^2$, having a recess $H^3$ for a screw driver to enter and turn the stopple. Means other than the recess $H^3$ may be present for enabling the screw stopple to be turned. In the vertical edge of one of the cones or rings as $F^2$, and on the side toward the co-operative ring, a groove or channel J is formed. This groove is less than one-half the diameter of a steel ball. The preferred depth of this groove, proportionate to the diameter of the ball, will ordinarily be substantially as shown in Figs. 4, 3, 5 and 6. To admit of the passage of the balls into place designed for them, viz: the annular bearing space I composed of the groove $A^2$ of the axle and the groove formed by opposing adjacent rings F and G, the outer cone or ring as F is screwed out and away from ring G sufficient to admit of the passage of the balls between the two rings at the groove J of the ring into said bearing space. The groove J holds the balls in place and duly directs them into the bearing as they pass down between the said rings. The groove J further allows the balls to be thus introduced without compelling the rings F and G to be separated so far as to allow the balls after entering the bearing space I to drop out of it again between the rings at another point below. It will be perceived that by this feature of my invention, the balls are quickly dropped into place and there safely retained.

When all of the balls have been inserted, the ring F is screwed back to place directly up to and against the back ring or cone G, and the bearing balls are now in working position as shown in Fig. 1, and the stopple $H^2$ is set in place, as shown in Fig. 1, &c.

The balls can be withdrawn from the bearing very readily by turning the hub, so that the opening H is underneath, and then screwing back the ring F as aforementioned, and removing stopple $H^2$, thereby allowing the balls to drop out. Ordinarily, however, in removing the balls from the bearing, the ring F is removed from the hub and the balls quickly withdrawn.

When the rings are not already in the hub, the first ring G (Fig. 1) is screwed to place, and the ring F is screwed in far enough to have the edge of the groove J coincide with the adjacent peripheral edge of the opening H. The balls are then introduced into the bearing place, and the ring F screwed up against ring G. This feature of my invention is also valuable in lubricating the working parts, already mentioned.

For the purpose of lubrication, remove the set screw or stopple $H^2$ in the hub band, then the front ring F at the front end of the hub, or the rear ring at the back end of the hub is moved or screwed slightly away from its companion ring until the groove in the face of ring F is directly under the hole in the band. Oil or other lubricant is then introduced through the vertical groove J in the face of the movable ring F and between rings F and G, the lubricant passing into the working space I and among the balls R. Then the movable ring F is screwed back to place and the oil or other lubricant is in the bearing.

Where there is more than one annular series of balls, the number of rings will be increased, and the intermediate ring G will for the sake of economy, serve not only as the rear ring co-operating with the front or outer ring F in connection with the front series of balls, but will also co-operate as the front ring in conjunction with a rear ring $G^2$ in connection with a second annular series of balls and in this conjunction the ring G will properly have on its rear face a groove J, similar to that in the ring F. An opening H in the band, and a stopple $H^2$ therefor will be provided in connection with the rings G and $G^2$. Such construction is quite fully illustrated in Figs. 5 and 6. The mode of inserting the balls into this second annular space and of removing them therefrom and of lubricating the working parts is substantially the same as has been heretofore described.

Each additional annular series of balls may be similarly provided for as to introduction into their working chamber or space I, their removal therefrom and their proper lubrication.

The constructions embodying the several features of my invention are economical of manufacture, simple in construction and readily operated.

Those constructions embodying the features of my invention relating to the introduction of the balls and the lubrication of the working parts are simple, economical of manufacture and are readily operated.

It will be observed that the ring F at the outer end of the hub has a cap $F^2$ thereby constituting an axle cap, and making a dust proof cap completely enveloping the front end of the axle.

It will also be remarked that the ring F at the inner end of the hub, in combination with the adjacent shoulder or collar L on the axle or spindle, forms a dust proof covering to the rear end of the spindle of the axle.

The combination of the various features of my invention as a unit results in a remarkably valuable, serviceable and desirable ball bearing axle and wheel.

What I claim as new and of my invention, and desire to secure by Letters Patent, is—

1. The band C having an opening H and the rings F and G, each ring having a recess and entering within said band, and the axle having a groove $A^2$, one of the rings having a groove J, and the bearing balls R substantially as and for the purposes specified.

2. The band C, having an opening H, and the rings F and G, screwing into the band, each ring having a recess and entering within said band, and the axle having a groove $A^2$, one of the rings having a groove J, and the bearing balls R substantially as and for the purposes specified.

3. In a hub, the band C, interiorly screw threaded, and the rings F, and G, exteriorly screw threaded, one of said rings having a groove J substantially radial, the band C having the opening H, provided with means for closing the same, the opening H being located over the space between the rings when one is retracted from the other, and balls R, and grooved axle or spindle, substantially as and for the purposes specified.

4. In a hub, the band C, interiorly screw threaded and the rings F and G, exteriorly screw threaded, one of said rings having a groove J substantially radial, the band C having the opening H, provided with the screw closing the same, the opening H being located over the space between the rings when one is retracted from the other, and balls R, and grooved axle or spindle, substantially as and for the purposes specified.

5. The combination of an axle, the band C, having the opening H, and the rings fitting within the band, one of said rings being provided with a radial groove therein of less depth than the radius of the ball which runs within the annular chamber formed by the rings and axle, substantially as and for the purposes specified.

6. The combination of an axle, the band C, having the opening H, and the rings fitting within the band, one of said rings being provided with a radial groove therein of less depth than the radius of the ball which runs within the annular chamber formed by the rings and axle, and an additional ring $G^2$, there being a second series of balls running in the annular chamber formed by the rings G, $G^2$, and the axle, the intermediate ring G having a groove J located toward ring $G^2$, substantially as and for the purposes specified.

7. The combination of the band C, having opening H, axle, balls, rings having annular recesses, one of said rings having a transverse groove or radial groove, the ring F having the cap and enveloping the end of the axle, substantially as and for the purposes specified.

8. The combination of the band C, having opening H, axle, balls, rings having annular recesses, one of said rings having a transverse groove or radial groove, the axle having the shoulder or collar L, the latter forming in conjunction with the adjacent ring F a cover for the exclusion of dust, substantially as and for the purposes specified.

9. The combination of the axle having shoulder or collar L, and the hub having bands C, C, each provided with openings as H for the insertion of balls R, and with rings having recesses S and grooves J, the outer ring F having cap $F^2$, all substantially as and for the purposes specified.

WILLIAM MEEKER.

Attest:
O. B. STRAUB,
J. E. BUSCHER.